(12) United States Patent
Park et al.

(10) Patent No.: US 9,587,089 B2
(45) Date of Patent: Mar. 7, 2017

(54) NANOTUBULAR TOUGHENING INCLUSIONS

(71) Applicant: THE UNITED STATES OF AMERICA AS REPRESENTED BY THE UNITED STATES NATIONAL AERONAUTICS AND SPACE ADMINISTRATION, Washington, DC (US)

(72) Inventors: Cheol Park, Yorktown, VA (US); Dennis C. Working, Norfolk, VA (US); Emilie J. Siochi, Newport News, VA (US); Joycelyn S. Harrison, Arlington, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/791,974

(22) Filed: Jul. 6, 2015

(65) Prior Publication Data
US 2015/0307691 A1  Oct. 29, 2015

Related U.S. Application Data

(60) Division of application No. 13/032,045, filed on Feb. 22, 2011, now Pat. No. 9,074,066, which is a continuation-in-part of application No. 11/644,019, filed on Dec. 22, 2006.

(60) Provisional application No. 60/834,529, filed on Jul. 31, 2006, provisional application No. 61/306,053, filed on Feb. 19, 2010.

(51) Int. Cl.
C08K 7/24 (2006.01)
B82Y 30/00 (2011.01)

(52) U.S. Cl.
CPC ............... *C08K 7/24* (2013.01); *B82Y 30/00* (2013.01); *C08K 2201/011* (2013.01)

(58) Field of Classification Search
CPC ...... B82Y 30/00; C08K 7/24; C08K 2201/011
USPC .......................................... 524/495; 523/218
See application file for complete search history.

(56) References Cited

U.S. PATENT DOCUMENTS

| | | |
|---|---|---|
| 7,402,264 B2 | 7/2008 | Ounaies et al. |
| 7,507,472 B2 | 3/2009 | Ounaies et al. |
| 7,588,699 B2 | 9/2009 | Park et al. |
| 7,666,939 B2 | 2/2010 | Wise et al. |
| 7,692,116 B1 | 4/2010 | Holloway et al. |
| 2003/0039816 A1 | 2/2003 | Wang et al. |
| 2003/0151030 A1 | 8/2003 | Gurin |
| 2003/0158323 A1 | 8/2003 | Connell et al. |
| 2004/0016912 A1 | 1/2004 | Bandyopadhyay et al. |
| 2004/0150140 A1* | 8/2004 | Zhan ............... B82Y 30/00 264/430 |
| 2008/0275172 A1 | 11/2008 | Wise et al. |

OTHER PUBLICATIONS

Emilie et al. (Melt processing of SWCNT—polyimide nanocomposite fibers, Composites: Part B 35 (2004) 439-446).*
Park et al. (Dispersion of single wall carbon nanotubes by in situ polymerization under sonication, Chemical Physics Letters, 364 (2002) 303-308).*
Conrad S. Lovell, Kristopher E. Wise, Jae-Woo Kim, Peter T. Lillehei, Joycelyn S. Harrison and Cheol Park, "Thermodynamic Approach to Enhanced Dispersion and Physical Properties in a Carbon Nanotube/Polypeptide Nenocornposite", Polymer 50, 2009, pp. 1925-1932.
David S. McLachlan, Cosmas Chiteme, Cheol Park, Kristopher E. Wise, Sharon E. Lowther, Peter T. Lillehei, Emilie J. Siochi, and Joycelyn S. Harrison, "AC and DC Percolative Conductivity of Single Wall Carbon Nanotube Polymer Composites," Journal of Polymer Science: Part B Polymer Physics, 2005, pp. 3273-3287, vol. 43, Wiley Periodicals, Inc.

* cited by examiner

*Primary Examiner* — Ling Choi
*Assistant Examiner* — Chun-Cheng Wang
(74) *Attorney, Agent, or Firm* — Jennifer L. Riley; Thomas K. McBride

(57) ABSTRACT

Conventional toughening agents are typically rubbery materials or small molecular weight molecules, which mostly sacrifice the intrinsic properties of a matrix such as modulus, strength, and thermal stability as side effects. On the other hand, high modulus inclusions tend to reinforce elastic modulus very efficiently, but not the strength very well. For example, mechanical reinforcement with inorganic inclusions often degrades the composite toughness, encountering a frequent catastrophic brittle failure triggered by minute chips and cracks. Thus, toughening generally conflicts with mechanical reinforcement. Carbon nanotubes have been used as efficient reinforcing agents in various applications due to their combination of extraordinary mechanical, electrical, and thermal properties. Moreover, nanotubes can elongate more than 20% without yielding or breaking, and absorb significant amounts of energy during deformation, which enables them to also be an efficient toughening agent, as well as excellent reinforcing inclusion. Accordingly, an improved toughening method is provided by incorporating nanotubular inclusions into a host matrix, such as thermoset and thermoplastic polymers or ceramics without detrimental effects on the intrinsic physical properties of the matrix.

11 Claims, 5 Drawing Sheets

Figure 1:
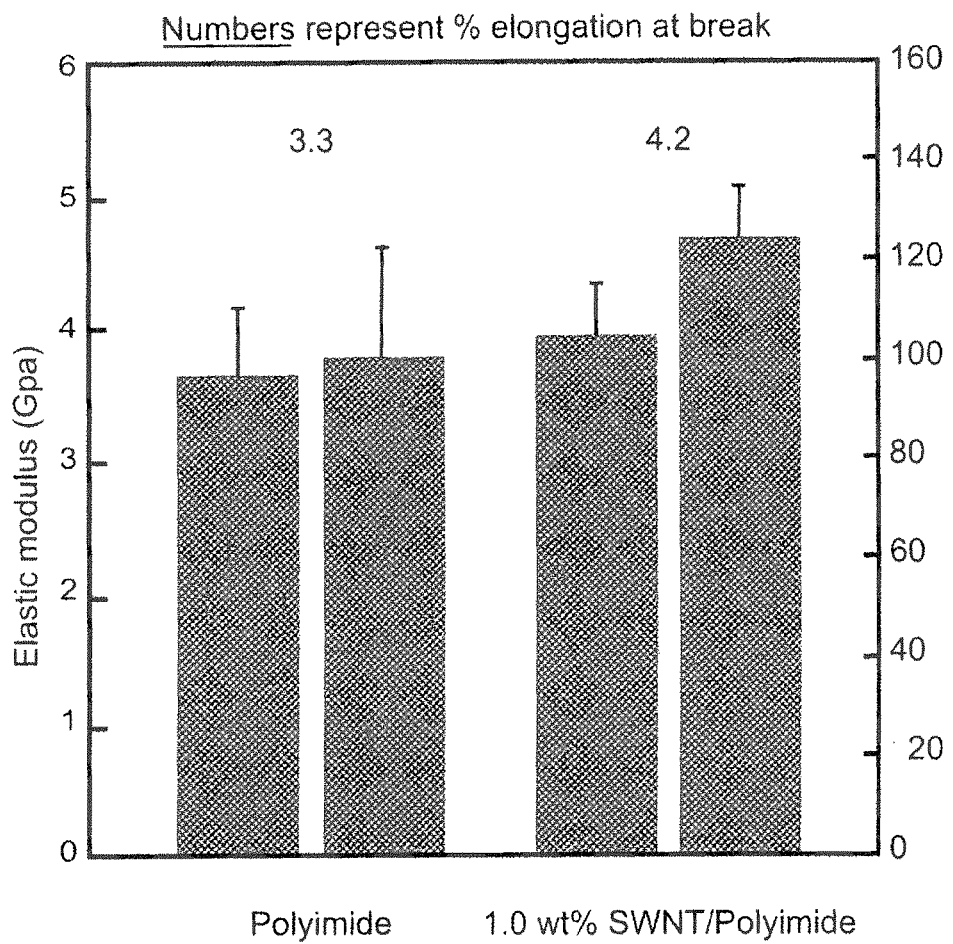

Figure 1. Tensile properties of 1wt% SWNT/CP2 Polyimide nanocomposite.

Figure 2:
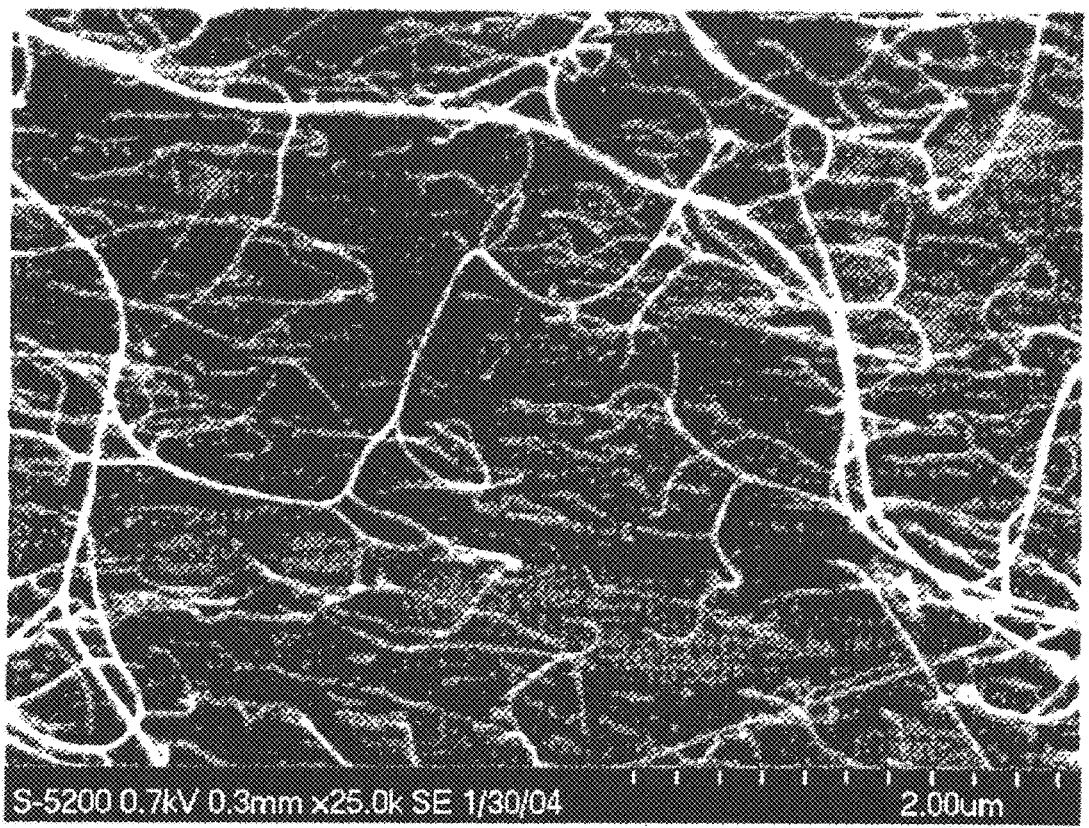

Figure 2. High resolution scanning electron micrograph of fracture surface of 0.5wt%SWNT polyimide nanocomposite.

Figure 3:
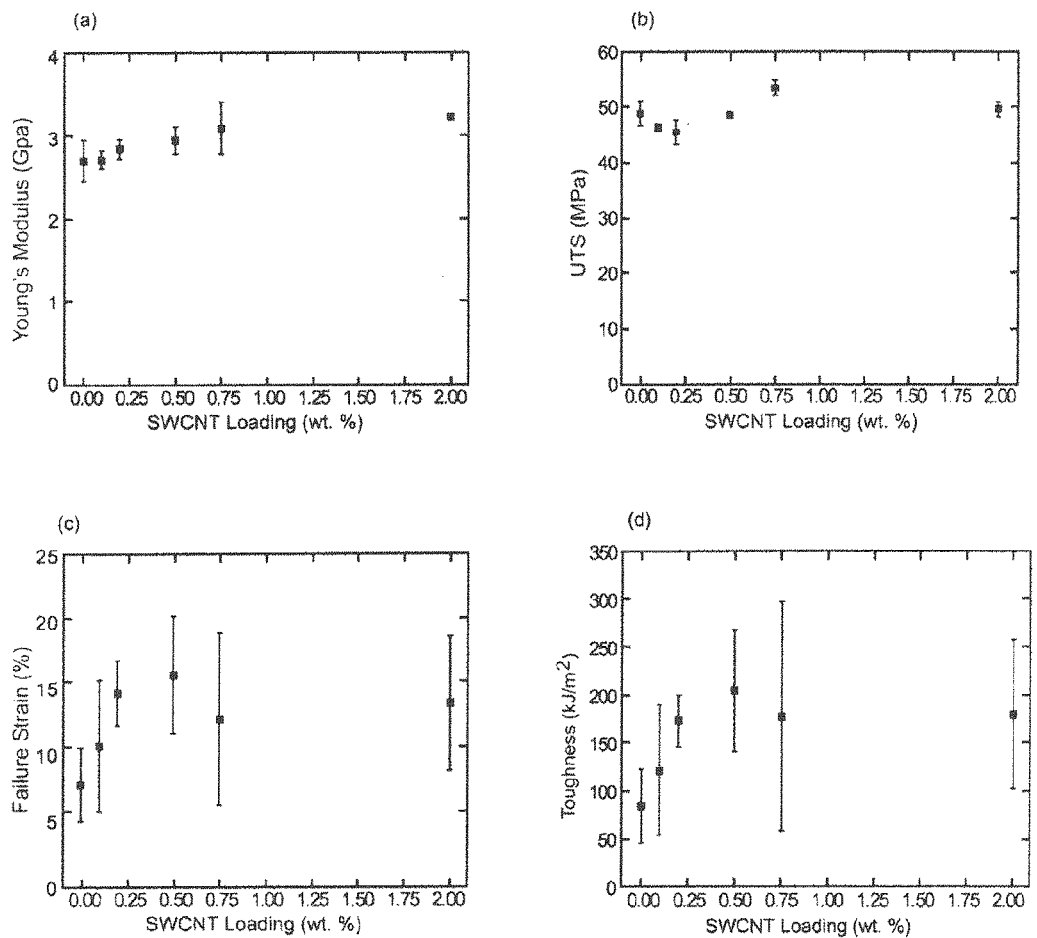

Figure 3. (a) Young's modulus, (b) ultimate tensile strength (UTS), (c) failure strain, and (d) toughness of the SWCNT/polyLF nanocomposites at the various SWCNT loadings.

Figure 4:
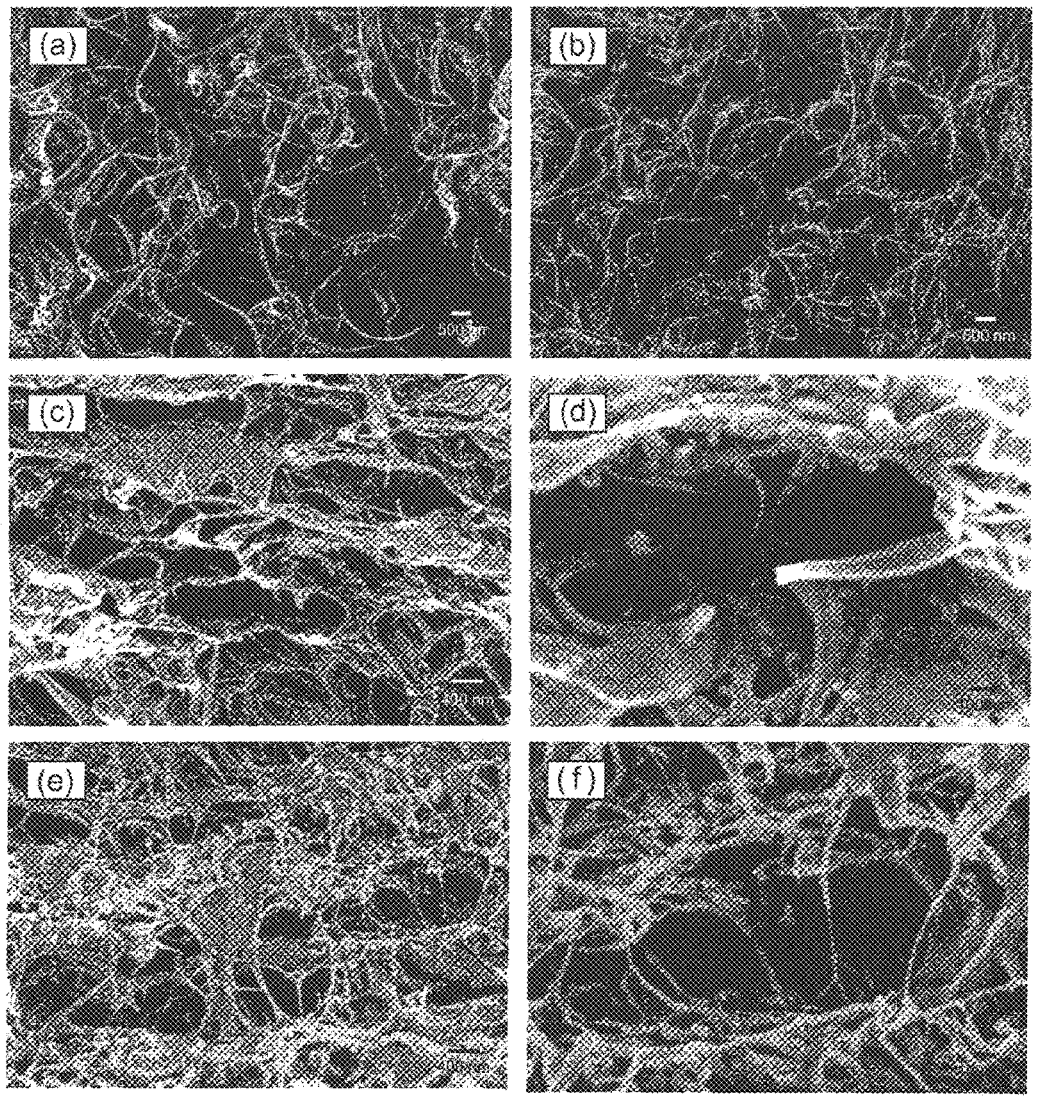

Figure 4. HRSEM images of the SWCNT/polyLF nanocomposite: (a) 0.5 wt% surface (b) 2.0 wt% surface, (c,d) 0% cross-section and (e,f) 2.0 wt% cross-section. The cross-sectional image samples were fractured in liquid nitrogen, with the 0 wt% images coated with 10 nm of silver to minimize charging.

Figure 5:
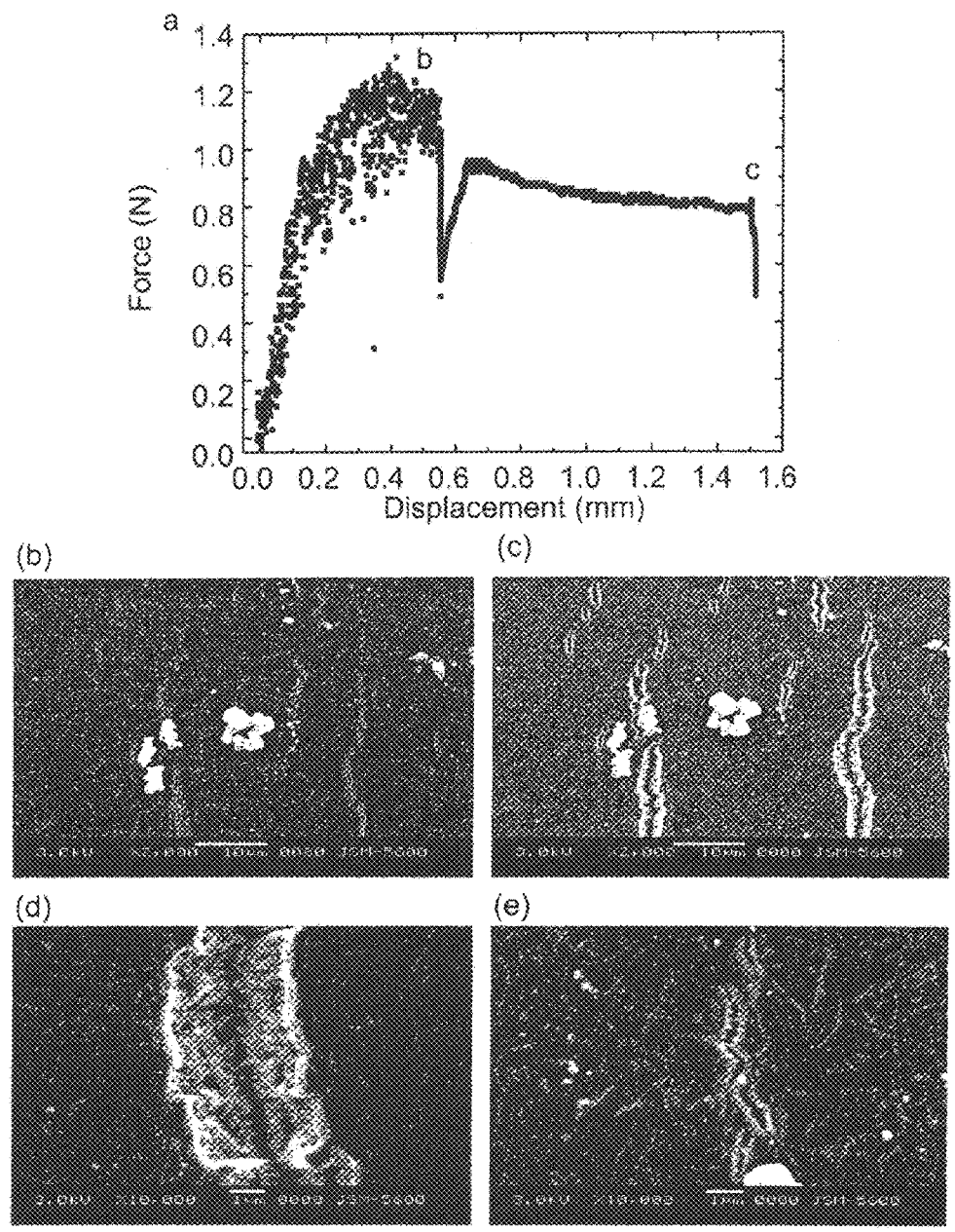

Figure 5. In-situ fracturing of the 2.0 wt% SWCNT/polyLF sample showing (a) the load versus displacement curve, (b) an image just after yielding, and (c) an image after extensive deformation. Higher magnification images show (d) nanotube bridging and (e) crack path deflection.

NANOTUBULAR TOUGHENING INCLUSIONS

CROSS-REFERENCE TO RELATED APPLICATIONS

This patent application is a divisional of U.S. Non-Provisional patent application Ser. No. 13/032,045 filed Feb. 22, 2011 which is a continuation-in-part of co-pending U.S. patent application Ser. No. 11/644,019, filed Dec. 22, 2006, which claims the benefit of U.S. Provisional Patent Application No. 60/834,529, filed Jul. 31, 2006. This patent application also claims the benefit of U.S. Provisional Patent Application No. 61/306,053, filed Feb. 19, 2010. The contents of the foregoing applications are hereby incorporated in their entireties.

STATEMENT REGARDING FEDERALLY SPONSORED RESEARCH AND DEVELOPMENT

This invention was made in part with Government support under cooperative agreement No. NCC-1-02043 awarded by the National Aeronautics and Space Administration. The Government may have certain rights in this invention.

BACKGROUND OF THE INVENTION

Many commercial polymers and brittle ceramics require toughening agents to be used as reliable structural materials to prevent catastrophic failures. Rubbery materials or small molecular weight molecules are often used as toughening agents to absorb energy while subject to applied loads by dissipating the concentrated stresses. Although these conventional toughening agents improve the toughness of the host matrix, e.g. the bulk material, the intrinsic mechanical properties such as modulus and strength drops due to lack of integrity of the toughening agents. Moreover, many conventional toughening agents significantly degrade thermal resistance of the bulk material, which further restricts use of those conventional agents to non-highly structured applications and non-elevated temperature environments.

Accordingly, an on-going need exists for methods for toughening materials with select agents that can overcome at least some of the trade-offs and deficiencies that exist in the art.

BRIEF SUMMARY OF THE INVENTION

In view of the foregoing, it is an object of the invention to provide a method of toughening materials while also maintaining intrinsic mechanical properties such as modulus and strength.

It is a related object of the invention to provide the ability to toughen materials for highly structured applications and/or elevated temperature environments.

These objects are achieved by the present invention, which provides a method for toughening materials using small amounts of nanotubular inclusions.

In one embodiment, the invention provides a method for toughening a composite material including the steps of providing a matrix material; providing an effectively small amount of an nanotubular inclusion agent; combining the matrix material with the inclusion agent by substantially dispersing the agent throughout the matrix; and, recovering a toughened composite material. The composite material is characterized as having at least about fifty percent increased toughness relative to the matrix material. Toughness, the energy required to break a material, is estimated by the work of rupture for a material specimen as measured by the area beneath a load versus displacement curve divided by a cross-sectional area of the specimen.

In another embodiment, the invention provides a method for toughening a composite material including the steps of providing a polymeric matrix material; providing an effectively small amount of a non-functionalized nanotubular inclusion agent such as carbon nanotubes or boron nitride nanotubes; combining the matrix material with the inclusion agent; and, recovering a toughened composite material. Preferably the inclusion agent is present in an amount of about 5 wt % or less, wherein the composite material is characterized as having at least about fifty percent increased toughness relative to the matrix material.

In yet another embodiment, the invention provides a method for toughening a polymeric nanocomposite material comprising the steps of providing a polymeric matrix material; providing an effectively small amount of a non-functionalized nanotubular inclusion agent; combining the matrix material with the inclusion agent, by utilizing in-situ polymerization under sonication in the presence of said inclusion agent; and, recovering a toughened composite material wherein said inclusion agent is present in an amount of about 0.3 wt % to about 2 wt %.

Additional objects, embodiments and details of this invention can be obtained from the following detailed description of the invention.

BRIEF DESCRIPTION OF THE SEVERAL VIEWS OF THE DRAWING(S)

FIG. 1 displays tensile properties of 1 wt % SWNT/CP2 Polyimide nanocomposite material as compared to the Polyimide matrix.

FIG. 2 displays high resolution scanning electron micrograph (HRSEM) of fracture surface of 0.5 wt % SWNT/polyimide nanocomposite.

FIG. 3 displays physical properties of various SWNT loadings into a polymer (polyLF) nanocomposite as (a) Young's modulus, (b) ultimate tensile strength (UTS), (c) failure strain, and (d) toughness of the composite.

FIG. 4 displays HRSEM images of SWNT/polyLF nanocomposites: (a) 0.5 wt % surface, (b) 2.0 wt % surface, (c,d) 0% cross-section with different zooms, (e,f) 2.0 wt % cross-section with different zooms. The cross-sectional image samples were fractured in liquid nitrogen, with the 0 wt % images coated with 10 nanometers of silver to minimize charging.

FIG. 5 displays in-situ fracturing of the 2.0 wt % SWNT/polyLF sample showing (a) the load versus displacement curve, (b) an image just after yielding, and (c) an image after extensive deformation. Higher magnification images show (d) nanotube bridging and (e) crack path deflection.

DETAILED DESCRIPTION OF THE INVENTION

Conventional toughening agents are rubbery materials or small molecular weight molecules, which sacrifice the intrinsic properties of a material matrix that contains them. Such properties include modulus, strength, and thermal stability. By incorporating nanotubular inclusions such as carbon nanotubes ("CNTs" that includes single wall nanotube ("SWNT" or "SWCNT"), few walled carbon nanotubes ("FWNTs") and multiwall carbon nanotubes ("MWNT"));

boron nitride nanotubes ("BNNTs" in the same variations of single wall, few wall, and multiwall configurations as CNTs); and combinations of CNTs and BNNTs, the toughness of the matrix can be improved without detrimental effect on the intrinsic physical properties of the host matrix. Instead, these nanotubular inclusions can improve mechanical strength, modulus and thermal stability as well as toughness at low loading levels owing to their (CNTs and BNNTs) excellent intrinsic properties such as high strength, modulus, resilience, and flexibility. In addition, electrical conductivities can be enhanced as well; thus, for instance, enabling dissipating electrostatic charge accumulation.

Without wishing to be bound to any one theory, it is believed that the toughening mechanism with the nanotubular inclusions can be mainly attributed to their flexibility and ability to extend to a significant degree (i.e., for instance, over about 20% elongation along the tube axis without yielding or break of the CNTs) even though the nanotubular mechanical properties are among the highest of known materials.

Accordingly, in at least one embodiment, the invention provides an excellent method for toughening a composite material comprising (a) providing a matrix material; (b) providing an effectively small amount of an nanotubular inclusion agent; (c) combining the matrix material with said inclusion agent, wherein the inclusion agent is substantially dispersed throughout the matrix material; and, (d) recovering a toughened composite material, wherein the composite material is characterized as having at least about fifty percent increased toughness relative to the matrix material, whereby toughness as the energy required to break a material is estimated by the work of rupture for a material specimen as measured by the area beneath a load versus displacement curve divided by a cross-sectional area of the specimen. In some instances, toughness can be increased by at least ninety percent relative to the pure matrix, and in other instances, toughness can be increased over one hundred percent relative to the pure matrix. Specific examples of toughness increases made while maintaining matrix properties are set forth below.

Preferably, the nanotubular inclusion agent is selected from the group consisting of carbon nanotubes, boron nitride nanotubes, and mixtures thereof. Furthermore, excellent results are achieved when the nanotubes are non-functionalized and are selected from the group consisting of single wall nanotubes, few wall nanotubes, multiwall nanotubes, and combinations thereof.

The matrix material can be either a polymer component and/or a ceramic component. Synthetic polypeptides are also considered herein to be polymers for purposes of the invention. Favorable results are achieved when the matrix material has moieties therein which are capable of donor-acceptor complexation with the nanotubular inclusion agent. Donor-acceptor complexation results in a transfer of electronic charge between the carbon nanotubes and matrix, effecting an attractive interaction there between, which attractive interaction is neither an ionic nor covalent bond between the nanotubes and the matrix. Thus a stable combination can be achieved, for instance using high-shear flow processing and/or sonication to obtain the substantially dispersed and/or uniformly dispersed nanotubes in matrix. Moreover, excellent benefits are also achieved when the matrix material is a polymer comprising an aromatic moiety that promotes a dispersion interaction with the nanotubes. For further details, see e.g., U.S. Pat. No. 7,666,939 and U.S. Pat. App. Pub. No. 2008/0275172, which are hereby incorporated by reference thereto.

In certain embodiments of the invention, effectively small amounts of nanotubular inclusions are utilized in the matrix material. In preferred embodiments, the nanotubular inclusion agent is present in the toughened composite material made by the method in an amount of about 10 wt % or less. In other preferred embodiments, the agent is present in an amount of about 5 wt % or less. In yet other preferred embodiments, the agent is present in an amount of about 0.3 wt % to about 2 wt %.

In still other embodiments of the invention, the method includes the step of combining a polymer matrix with a nanotubular inclusion by utilizing in-situ polymerization under sonication in the presence of such an inclusion agent in order to substantially (and/or uniformly) disperse the agent throughout the matrix. Preferably, the sonication is conducted at least in part simultaneously with the polymerization reaction in these embodiments. For further details, see e.g., U.S. Pat. No. 7,588,699, which is hereby incorporated by reference thereto.

Products made by methods of the invention can be prepared by forming the toughened composite material into, for example and without limitation, a film, a fiber, a coating, a foam, an adhesive, or a mold by conventional methods known to the art (i.e., by casting, spraying, spinning, extrusions, melt press, etc.), which is concomitant to the advantages maintained by the small inclusions which provide for toughening without significantly altering the requirements for normal material processing.

Markets for toughened composites range, without limitation, from conventional commodity plastic goods to high tech based aerospace, automotive, and microelectronics.

The following examples further illustrate the invention but, of course, should not be construed as in any way limiting its scope.

Example 1

This example demonstrates at least one aspect of the present invention. As shown in FIG. 1, a sample prepared with 1% inclusion of SWNTs in a polyimide (Colorless Polyimide 2: LaRC CP2, available from NASA Langley Research Center) by simple shear mixing increased elastic modulus (left x-axis, GPa), yield strength (right x-axis, MPa), % elongation at break (numbers on top) of the composite by about 8%, 23%, 29%, respectively, compared to the pristine polyimide, and thus about fifty percent (~49%) toughness increase was achieved.

Next, SWNT/Polyetherimde (Ultem) nanocomposite films processed by melt mixing also showed 100% toughness increase with 1.0% SWNT loading along with increase in modulus, strength, and % elongation at break as seen in Table 1.

TABLE 1

Summary of SWNT/Ultem Nanocomposite Film Tensile Properties.

| SWCNT (wt %) | Cross-head Speed (mm/min) | Tensile Modulus (GPa) | Elongation (%) | Toughness (mJ/mm$^3$) | Ultimate Strength (MPa) | Yield Stress (MPa) |
|---|---|---|---|---|---|---|
| 0 | 5.0 | 2.9 | 4.9 | 25.5 | 104 | 63 |
| 0.3 | 5.0 | 3.0 | 5.5 | 51 | 111 | 62 |
| 1.0 | 5.0 | 3.2 | 5.5 | 52.5 | 114 | 64 |

The toughening effect of SWNTs was universal as long as uniform dispersion of the nanotubes was reasonably achieved. Better dispersion of CNTs in a nanometer scale tends to achieve a better toughening effect along with better mechanical, electrical, and dielectric reinforcements. For example, uniform dispersion of nanotubes in a host polymer is achieved by utilizing the "in-situ polymerization under sonication method." In addition, the uniform dispersion of nanotubes in a polymer matrix is further stabilized by incorporating donor-acceptor interactions between the nanotubes and the matrix by selecting a polymer matrix containing an appropriate functional group such as an electron acceptor or donor. The non-covalent bonding between the nanotube and the host matrix may improve the van der Waals interaction and can be one important factor for the toughening effect. Since chemical bonding created by functionalized nanotubes can tend to make the host matrix brittle, toughening may be less effective in some instances with those nanotubes.

A high resolution scanning electron micrograph (HRSEM) fracture surface of SWNT/polyimide composite in FIG. 2 revealed that a number of flexible nanotubular inclusions were pulled out during the fracture, created many physical entanglements with others, and most of nanotube bundles were split during the fracture. These pull-out, physical entanglements, and bundle splitting absorbed the fractures energy with their extremely large surface areas and inhibit crack propagation by bridging cleaved matrix surface are believed to be at least partially, if not wholly, responsible for the majority of toughness improvement.

Example 2

In order to further investigate the origin of the increased toughness by incorporating single wall carbon nanotubes (SWCNT) into polymers, additional composite materials were prepared. Purified SWCTs made by the High Pressure CO (HiPCO) synthesis method were purchased from Carbon Nanotechnologies, Inc. and contained less than 3% iron. A polymer in the form of a copolypeptide, i.e. poly (L-Leucine-ran-L-Phenylalanine), or polyLF, was provided by the University of California, Santa Barbara.

Six SWCNT/polyLF samples were made with SWCNT loadings of 0, 0.075, 0.2, 0.5, 0.75, and 2.0 wt %. For the samples containing carbon nanotubes, a suspension of chloroform and SWCNTs was initially made (0.068 wt % SWCNT/chloroform) and pulse-sonicated (5 s on, 5 s off) with a cup sonicator for 18 min at 12 W and 20 kHz, and then appropriate amounts were added to the dry copolypeptide powder. A low wattage was used to sonicate the nanotube suspension to avoid SWCNT damage. More chloroform was then added to lower the polymer concentration to 4 wt %. Every polymer solution (with or without SWCNTs) was also pulse-sonicated (5 s on, 5 s off) for 18 min in a cup sonicator (36 W, 20 kHz), followed by 1 hour of sonication in a bath sonicator (70 W, 42 kHz). All solutions were stirred constantly, except when subjected to cup sonication. Low molecular weight surfactants were not used to aid carbon nanotube dispersion due to their tendency to act as plasticizers, which may degrade the physical properties of the polymer matrix. Furthermore, functionalization of the nanotubes was not used since this may damage the sp2 bonding of the nanotubes, ultimately diminishing the properties of the copolypeptide composites as well. After the samples were sonicated and stirred, they were cast onto a non-stick TEFLON substrate using a film applicator. Following overnight solvent evaporation in a dessicator, the samples were placed in a vacuum oven for another 48 h at room temperature to ensure complete solvent removal. The composite films, approximately 30-35 mm thick, detached easily from the substrate for characterization.

Characterization was performed with a Hitachi S-5200 high resolution scanning electron microscope (HRSEM), with a field emission electron gun and in-lens detector, and it was used to examine nanotube dispersion near the surface of the samples, as well as the cross-sectional sample morphology. SEM samples of the SWCNT/polyLF composite films for surface imaging were cut to approximately 6 mm×3 mm and mounted on sample stages with silver paste. Cross-sectional SEM samples were fractured in liquid nitrogen, and samples below the electrical percolation threshold (<0.47 vol %) were coated with 10 nm of silver. A JEOL 5600 JSM-SEM, equipped with a Gatan Microtest 200 stage and Deben controller, was used for in-situ fracture imaging. Tensile properties of the films were evaluated at room temperature using an Instron 5848 MicroTester equipped with a 1000 N load cell. Instron samples were cut in 3 mm wide rectangular strips using a JDC precision sample cutter (Thwing-Albert Instrument Company), and tested with a 30 mm gauge length at an extension rate of 3 mm/min according to ASTM 882. Six samples were tested for each composite film. A Novocontrol broadband dielectric converter and a Solartron S11260 impedance gain/phase analyzer were used to evaluate electrical and dielectric properties. A 25.4 mm diameter silver electrode (approximately 50 nm thick) was deposited on both sides of the sample prior to testing.

The SWCNT/polyLF Young's moduli as a function of carbon nanotube loading are summarized in Table 2 and plotted in FIG. 3(a). The Young's modulus increased steadily with increasing SWCNT content up to a loading of 0.75 wt % where it reaches 3.09 GPa, an increase of 15% over the pristine sample (2.70 GPa). Further increase of the SWCNT content to 2.0 wt % yields a small additional improvement, with the modulus increasing to 3.23 GPa, or a 20% increase over the pure polymer. The ultimate tensile strengths (UTS) of the SWCNT/polyLF nanocomposites, shown in FIG. 3(b), were relatively unaffected by SWCNT incorporation, at least up to loading levels of 2.0 wt %.

TABLE 2

Values of Several SWCNT/polyLF Nanocomposite Properties.

| SWCMT (wt %) | Modulus (GPa) | UTS (MPa) | Failure strain (%) | Toughness (kJ/m$^2$) | log($\sigma$) @ 1 kHz (S/cm) | $\epsilon$@ 1 kHz |
| --- | --- | --- | --- | --- | --- | --- |
| 0 | 2.70 | 48.75 | 7.02 | 83.18 | −11.69 | 2.95 |
| 0.075 | 2.71 | 46.35 | 10.02 | 121.24 | −11.44 | 3.22 |
| 0.2 | 2.84 | 45.30 | 14.11 | 172.05 | −11.25 | 3.72 |
| 0.5 | 2.94 | 48.41 | 15.51 | 203.22 | −7.81 | 22.81 |
| 0.75 | 3.09 | 53.51 | 12.08 | 177.48 | −5.88 | 38.48 |
| 2.0 | 3.23 | 49.51 | 13.31 | 179.26 | −4.38 | — |

While the failure strains of most polymers decrease, sometimes drastically, upon addition of reinforcing fillers, our SWCNT/polyLF nanocomposites actually showed an increase in this material property. Starting from a relatively moderate failure strain of 7% for the pure polypeptide in FIG. 3(c), the addition of SWCNTs resulted in a maximal increase of 121% at 0.5 wt % loading and a still significant gain of 90% at a loading level of 2.0 wt %. FIG. 3(d) plots toughness, which is related to failure strain, as a function of SWCNT loading. Toughness, the energy required to break a material, is estimated by measuring the work of rupture, or the area beneath a load versus displacement curve, and dividing this by the specimen's cross-sectional area. Polymers typically become more brittle with the addition of reinforcing fillers, but polyLF's toughness actually improves with addition of carbon nanotubes, becoming more ductile while simultaneously increasing its modulus and maintaining its overall strength. As shown in FIG. 3(d), the pristine sample exhibited a toughness of 83.18 kJ/m2. This toughness value increases by 144% for the 0.5 wt % SWCNT loading, and 116% for the 2.0 wt % sample. Note that this data was not obtained with a typical Impact Test (e.g. Charpy Test), and is merely a relative measure for comparison among the samples in this study. While the data exhibits a high standard deviation, the increase in the composite toughness cannot be disregarded, particularly at 0.2 and 0.5 wt %, where the toughness values are well above the pristine sample.

To visualize the carbon nanotube dispersion, scanning electron micrographs of the SWCNT/polyLF nanocomposite film surfaces were taken, shown in FIGS. 4(a) and (b). These images, representing the 0.5 and 2.0 wt % samples respectively, were taken at an accelerating voltage between 20 and 30 kV. The high voltages used in these micrographs create a beam that penetrates through the polymer matrix. These "poly-transparent" images give better insight into the level of dispersion by revealing nanotube bundles embedded deep into the nanocomposite which are not visible in conventional topographical images. The poly-transparent images reveal flexible nanotube networks throughout the matrix with a few loosely entangled nanotube agglomerates. Overall, FIGS. 4(a) and (b) show that reasonably uniform carbon nanotube dispersion was achieved in polyLF using only shear mixing and sonication (i.e. without resorting to surfactants or covalent functionalization).

In FIG. 4(c)-(f), the fractured cross-sections of the 0 wt % (FIGS. 4(c) and (d)) and 2.0 wt % (FIGS. 4(e) and (f)) samples are shown. Carbon nanotubes can clearly be seen as thin, bright filaments in images (e) and (f), a result of the emission of secondary electrons. The 0 wt % sample images show porous fibrous morphology with thicker protrusions and connections between polymer regions. Many of these connections were broken during the fracturing process, as shown in FIG. 4(d). In contrast, the 2.0 wt % sample exhibits much finer fibrillar structures, indicated by the thin, bright regions in the images. Also note that the SWCNTs clearly span the crevices of the nanocomposite, giving these images a threadlike, connected, and rough appearance compared to images of the pure polymer. This increased roughness and persistent spanning of the crevices suggest a possible mechanism for the nanocomposite enhanced toughness.

Characterization was also performed in-situ tensile tests for SWCNT/copolypeptide (LF) composites in a JEOL 5600 JSM-SEM fitted with a Gatan Microtest 200 stage and Deben controller. An in-situ load-displacement curve for a 2.0 wt % SWCNT/LF composite sample performed inside of the SEM chamber is shown in FIG. 5(a). FIGS. 5(b) and (c) show consecutive SEM images of one location obtained just after yielding, and after extensive deformation, respectively, which correspond to the (b) and (c) markers on the load displacement curve in FIG. 5(a). The load drops at (b) and (c) in this Figure indicate a stress relaxation which occurred while holding the strain constant during imaging. The progressive initiation and slow propagation of many small cracks shown in FIGS. 5(b) and (c), as opposed to one catastrophic crack in brittle failure, at least partially accounts for the high energy absorption and toughness that this material exhibits. In general, crack fronts can change in length as they interact with inhomogeneous inclusions. Many nanotubes in the percolated network throughout the matrix can interact with the crack fronts, absorbing large amounts of energy and toughening the composite. In the close-up image shown in FIG. 5(d), it is apparent that small cracks are held together by the SWCNTs and this bridging is likely to be one of the major toughness-improving mechanisms. This spanning by carbon nanotubes can also be seen clearly in the cross-sectional images of FIGS. 4(e) and (f) discussed earlier. The strong, flexible, and ductile SWCNTs act like a thermoplastic toughener by bridging cracks and exerting compressive traction in the crack wake. The SWCNTs are pulled out during the crack opening process, absorbing significant amounts of energy due to the large interfacial area between the SWCNTs and the matrix. Carbon nanotubes, which have extremely large aspect ratios, are particularly effective for crack bridging, as this mechanism tends to favor larger fillers. Better dispersion and more interfacial bonding, which occur between our specifically designed copolypeptide and SWCNTs, can provide higher energy absorption resulting in enhanced toughness. Another mechanism for increasing the work of rupture is effective crack path deflection by the uniformly dispersed nanotubes, as in FIG. 5(e). This deflection changes the crack propagation from a mode-I (tensile) to mode-II (shear) failure character, which enhances energy absorption as most materials are more resistant to this latter type of crack opening. Other obvious contributors to the improved toughness are physical entanglements of nanotubes and nanotube bundle bifurcation/splitting as shown in FIG. 4. Ubiquitous physical entanglements and bifurcated/split nanotubes have also been observed. This characteristic enables good energy absorption as a result of the excellent binding forces between the nanotubes in the bundles during fracture. In-situ SEM images of the fractured nanocomposite shown in FIG. 5 substantiate the toughness results discussed above, and illustrate how excellent dispersion and enhanced compatibility between the matrix and filler provide a more mechanically robust composite for various applications.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for toughening a composite material comprising:
   (a) providing a matrix material;
   (b) providing an effectively small amount of a nanotubular inclusion agent comprising boron nitride nanotubes or any mixture of boron nitride nanotubes and carbon nanotubes;
   (c) combining the matrix material with the nanotubular inclusion agent, wherein the nanotubular inclusion agent is substantially dispersed throughout the matrix material; and,
   (d) recovering a toughened composite material, wherein the composite material is characterized as having at least about fifty percent increased toughness relative to the matrix material, whereby toughness is the energy required to break a material and is estimated by the work of rupture for a material specimen as measured by the area beneath a load versus displacement curve divided by a cross-sectional area of the specimen.

2. The method of claim 1, wherein the carbon nanotubes are non-functionalized and are selected from the group consisting of single wall nanotubes, few wall nanotubes, multiwall nanotubes, and combinations thereof.

3. The method of claim 1, wherein the matrix material comprises a polymer component or a ceramic component.

4. The method of claim 1, wherein the matrix material has moieties therein which are capable of donor-acceptor complexation with the nanotubular inclusion agent.

5. The method of claim 1, wherein the matrix material is a polymer component comprising an aromatic moiety.

6. The method of claim 1, wherein the nanotubular inclusion agent is present in the toughened composite material in an amount of about 10 wt % or less.

7. The method of claim 6, wherein the nanotubular inclusion agent is present in an amount of about 5 wt % or less.

8. The method of claim 7, wherein the nanotubular inclusion agent is present in an amount of about 0.3 wt % to about 2 wt %.

9. The method of claim 1, wherein the matrix material is a polymer and the combining step is further characterized as utilizing in-situ polymerization under sonication in the presence of said inclusion agent.

10. The method of claim 1, wherein the matrix material initially comprises a dry copolypeptide powder that is subsequently mixed with a liquid comprising the nanotubular inclusion agent.

11. The method of claim 1 further comprising the step of forming the toughened composite material into a film, a fiber, a coating, a foam, an adhesive, or a mold.

* * * * *